United States Patent
Iuliano

(10) Patent No.: US 7,452,075 B2
(45) Date of Patent: Nov. 18, 2008

(54) HYDRODYNAMICALLY OPERATED MULTIFOCAL CONTACT LENS

(75) Inventor: Michael J. Iuliano, Point Pleasant Beach, NJ (US)

(73) Assignee: In Technology Holding LLC, Toms River, NJ (US)

( * ) Notice: Subject to any disclaimer, the term of this patent is extended or adjusted under 35 U.S.C. 154(b) by 0 days.

(21) Appl. No.: 11/687,953

(22) Filed: Mar. 19, 2007

(65) Prior Publication Data

US 2008/0231799 A1 Sep. 25, 2008

(51) Int. Cl.
*G02C 7/04* (2006.01)
*G02C 7/02* (2006.01)

(52) U.S. Cl. ............... 351/161; 351/160 R; 351/177
(58) Field of Classification Search ............ 351/160 R, 351/161, 160 H, 177
See application file for complete search history.

(56) References Cited

U.S. PATENT DOCUMENTS

| 3,973,838 A | | 8/1976 | Page |
| 4,174,156 A | * | 11/1979 | Glorieux ............... 351/168 |
| 4,477,158 A | * | 10/1984 | Pollock et al. ........... 351/169 |
| 4,702,573 A | * | 10/1987 | Morstad ................. 351/161 |
| 2002/0021409 A1 | * | 2/2002 | Marmo ................ 351/160 R |
| 2006/0290882 A1 | * | 12/2006 | Meyers et al. ......... 351/160 H |

* cited by examiner

*Primary Examiner*—Scott J. Sugarman
*Assistant Examiner*—James R Greece
(74) *Attorney, Agent, or Firm*—Gottlieb, Rackman & Reisman, P.C.

(57) ABSTRACT

This invention pertains to a soft contact lens that has a body with a central zone aligned with the optical axis of the eye when a wearer wears the lens. A micro-channel filled with fluid, is positioned at or near the optic zone and is arranged so that when the fluid is pressurized, the micro-channel expands and changes the optical characteristics of the central zone. The pressure in the microchannel is controlled through changes to a reservoir disposed in the lens below the optic zone.

16 Claims, 4 Drawing Sheets

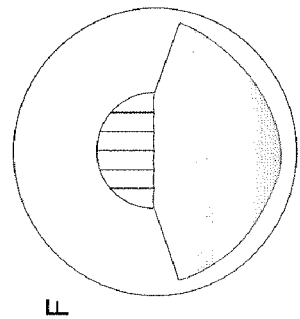
Figure 2A
Single Chamber Hydrodynamic Zone
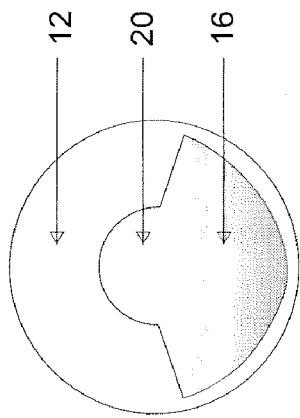
Figure 2F
Multi-Chamber Hydrodynamic Zone
Figure 2B
Deflated Optical Zone
Figure 2D
Inflated Optical Zone
Figure 2C
Figure 2E
Figure 2G
Deflated Optical Zone
Figure 2H
Figure 2I
Inflated Optical Zone
Figure 2J
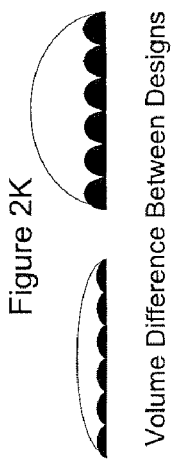
Figure 2K
Same Refractive Change with Less Volume
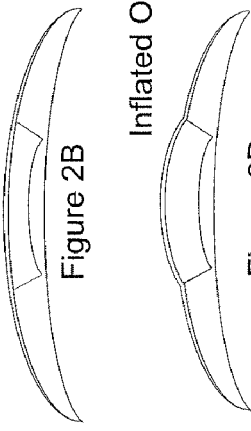
Volume Difference Between Designs

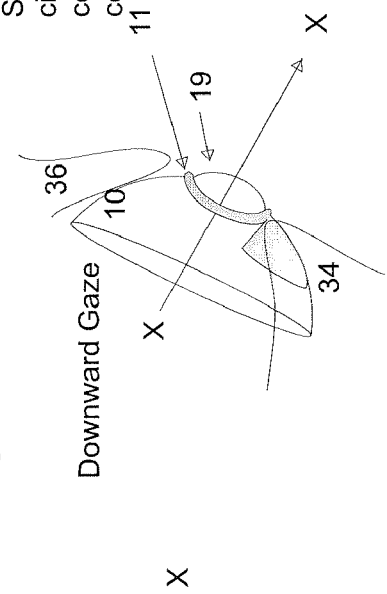
Figure 4A
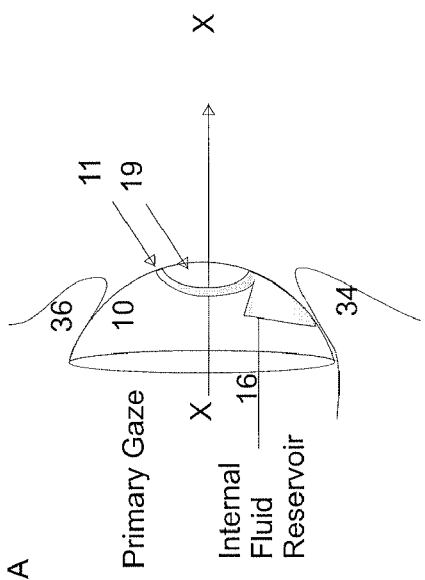
Figure 4B
Figure 4C
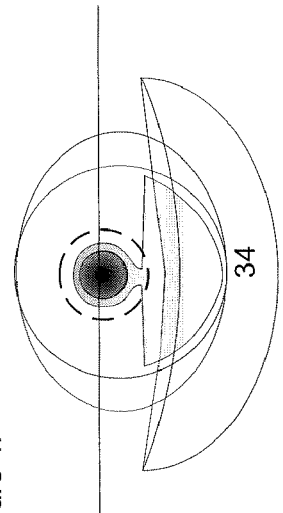
Figure 4D
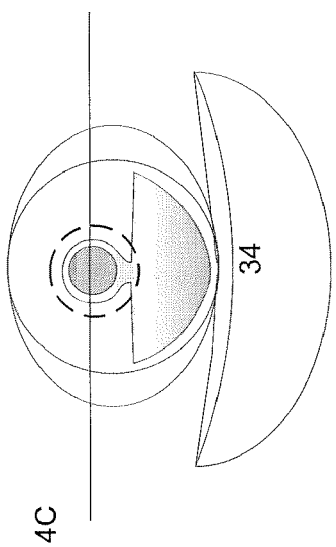
Figure 4E
Figure 4F

HYDRODYNAMICALLY OPERATED MULTIFOCAL CONTACT LENS

RELATED APPLICATIONS

This application is related to copending U.S. application Ser. No. 11/326,261 filed Jan. 5, 2006 entitled Hydrodynamically Operated Multifocal Contact Lens, now pending; and to copending U.S. application Ser. No. 11/689,595 filed on Mar. 22, 2007 entitled "Manufacturing Techniques for Production of Hydrodynamic Multifocal Contact Lenses", now pending, all incorporated herein by reference.

BACKGROUND OF THE INVENTION a. Field of the Invention

This invention deals with the art of vision correction through the application of a soft contact lens to the human eye. More particularly, this invention details a novel method to dynamically alter the optical characteristics of a soft contact lens by changing the shape of the lens using a fluid disposed therein.

b. Description of the Prior Art

The human eye contains two main tissues or elements that act to focus light onto the retina. The cornea, which is the clear, watch crystal-like tissue on the outside of the eye, focuses light coming from distant objects. The ability to see distant objects is referred to herein as distance vision.

The other tissue or element is the crystalline lens on the inside of the eye (i.e., disposed radially inwardly from the cornea) that performs the Afocusing necessary to clearly image objects closer than approximately 20 feet, hereinafter referred to as near objects or near vision. The lens consists of concentric layers of protein arranged like an onion. In many people, and typically as a person ages, the lens gradually thickens and becomes less pliable. By the age of around 40, many people experience a condition known as presbyopia, which is characterized as a decreased ability to focus on near objects resulting from this thickening of the lens.

Historically, presbyopia has been addressed by prescribing spectacle lenses or glasses. These glasses are available in two forms: as reading lenses and, for people who have additional vision deficiencies such as myopia, as multifocal lenses. Reading glasses are appropriate to correct near vision. Their disadvantage is that a wearer must remove them in order to see clearly at distance. Glasses with multifocal lenses, including bifocal and progressive lenses, address both distance and near vision. These types of lenses provide correction by having lens portions with different focal points. Generally, an upper portion of the lens is adapted to correct for distance vision while a bottom portion is adapted for near vision. The person wearing the glasses adjusts their head so that they can gaze through the top portion to see far objects. In order to see near, they would keep their head as if they were looking at a distance then rotate their eyes downward so that they can gaze through the bottom portion in order to clearly focus on near objects. By changing the position of the eyes in the eye sockets, the wearers align their optical axes with different portions of the lenses. Multifocal lenses, including trifocals and progressives, may have additional portions to provide accurate focusing for objects at various intermediate distances from a wearer.

Some forty years ago, contact lenses (or contacts) started to be used as a common alternative to glasses to address both distance and near blurred vision. Two types of contact lenses are presently in use: Rigid Gas Permeable or hard contact lenses, and soft contact lenses. Hard contact lenses to correct distance vision generally are fit to partially rest under the upper lid and move with the lid during the blink. Translating bifocal hard contact lenses provide for correction for both distance and near vision, but work somewhat differently in that the lower edge of the contact rests against the lower lid so that as the wearer's gaze changes from a distant to a near object, the lens stays stationary at the lower lid while the eye rotates downward and gazes through the near vision portion of the contact. As a result, similar to glasses, as wearers move their eyes downward, they align their optical axes with different portions of the corrective hard contact lenses.

Soft contact lenses on the other hand drape on the cornea like a wet tee shirt and therefore remain essentially in the same location with respect to the optical axis of the eye, even during the blink. As a result, even as an eye moves, the contact lens effectively moves with it; therefore it effectively remains fixed relative to the eye's optical axis. This constant positioning insures that the optical axes of the contact lens and the natural lens of the eye coincide.

Such an approach presents a problem when one wants to create a bifocal soft contact lens because, no matter the direction of gaze, the visual axis of the eye always passes through the same portion of the lens. This problem is currently addressed by a contact lens that contains multiple refractive surfaces disposed directly along the visual axis. Examples of designs used for this purpose include aspheric, diffractive, concentric power rings, and refractive islands. All of these designs focus light coming from different distances onto the retina simultaneously. However, these designs all can result in "double or triple exposures" on the retina and can significantly degrade the quality of the retinal image, making such lenses unattractive to portions of the population. Therefore there is a need for an effective and user friendly multifocal contact lens.

SUMMARY OF THE INVENTION

As discussed above, as the eyeball moves, the optical axis of a soft contact lens and the natural lens remain substantially coincident. Therefore, providing a contact lens having different refractive powers along different optical axes (as is the case with multifocal glasses) does not provide a solution to the problem of most patients. The present invention provides a solution to this problem by providing a lens that changes its optical characteristics (e.g., magnification power, its focal length, and/or refractive power) dynamically and in situ. In particular, a soft contact lens is disclosed that includes a cavity with one or more flexible internal chambers arranged at or near the optical axis of the eye, and one reservoir initially filled with a fluid. Movement of the eye causes the fluid to selectively move between the reservoir and the cavity in a manner designed to provide in situ changes to the optical characteristics of the soft contact lens. Preferably, the fluid is selected so that it has the same characteristics as the material of the lens to avoid any internal reflections. Typically, the fluid may be a silicone oil or saline solution.

According to one embodiment of this invention a contact lens includes a reservoir filled with fluid. For distance viewing, the bulk of the fluid generally remains outside the wearer's optical axis. The reservoir is constructed and arranged so that it undergoes compression by the natural force of apposition of the lid applied to the eye itself during downward gaze. This compression forces fluid to move from the reservoir and into the internal chambers, thereby dynamically changing the shape of the lens, and thereby dynamically altering the optical characteristics of the contact lens. Conversely, when the wearer looks up the lens rides up from behind the lower lid thereby releasing the compression forces from the lid, allowing the fluid to return to the reservoir, thereby allowing the lens to return to its natural shape which is configured for distance vision. Thus, as described above, advantageously, in the present invention it is the position of gaze that determines the contact lens's optical characteristics in the field of vision. More specifically, the further the eye is in downward gaze the greater the change in the characteristics. Preferably, a downward gaze gradually changes the lenses focal point from the eye's distance vision to the eye's near vision. In effect this creates a continuous variable multifocal contact lens. This can be accomplished through using fluid pressure to reshape; squeeze the lens; or a combination of the above.

These principles may be used to provide other optical configurations as well. More specifically, the lens is constructed so that this wiping action of the lids causes a fluid within the reservoirs to shift toward or away from a subject's axis of gaze, thereby causing a corresponding change in the optical characteristics of the lens relative to the wearer's gaze. The movement of the fluid, or reshaping of the cavity, changes the optical characteristics of the lens, adjusting for the correction required for the user.

The use of a plurality of chambers, which can change shape through associated fluid movement responsive to nominal eyelid pressure, permits substantial changes in the optical characteristics of the lens. The dimensional changes occurring to the contact lens have designed features that would allow maximum refractive changes under minimum lid pressure while maintaining lens position and comfort. These features increase the range of patients able to gain benefit from reservoir lenses, especially considering that the pressure of lid apposition to the eye decreases with age. This invention also broadens the population of potential beneficiaries to include emmetropic presbyopes (individuals who only need correction for reading and not for distance) but whose eyelid pressure is insufficient for the reservoir lenses in the prior art as seen in Hydrodynamically Operated Multifocal Contact Lens. This invention is beneficial to this population because current products diminish the clarity at distance, which makes those designs unacceptable to individuals who otherwise have clear distance vision.

In another embodiment, the contact lens includes an internal cavity made up of a single reservoir combined with multiple chambers, or micro-channels or micro-tubes to allow for multiple small base cure changes instead of one large base curve change, thereby easing pressure required for fluid movement. Fluid exchange can be avoided completely by creating a diaphragm covering the base of the micro-channels leading into the optic zone. The diaphragm allows fluid pressure to be exchange between the peripheral reservoir and the central micro-channel optic zones without any fluid exchange, thereby eliminating contamination risks.

BRIEF DESCRIPTION OF THE DRAWINGS

FIG. 2A shows a first embodiment of the lens;

FIGS. 2B and 2C show a cross-sectional view of the lens of FIG. 2A in a deflated condition;

FIGS. 2D and 2E show a cross-sectional view of the lens of FIG. 2A in an inflated condition;

FIG. 2F shows a second embodiment of the lens;

FIGS. 2G and 2H show a cross-sectional view of the lens of FIG. 2F in a deflated condition;

FIGS. 2I and 2J show a cross-sectional view of the lens of FIG. 2F in an inflated condition;

FIG. 2K show comparative side sectional views of the lens in FIGS. 2H and 2J;

FIG. 4A shows a side view of a lens conforming to a fourth embodiment of the invention;

FIG. 4B shows a cross-sectional view of the lens of FIG. 4A with the micro-channel deflated;

FIG. 4C shows a front view of the lens of FIG. 4B;

FIG. 4D shows a view similar to the one in FIG. 4A with the eye gazing downward;

FIG. 4E shows a cross-section of the lens of FIG. 4B with the micro-channel inflated;

FIG. 4F shows a front view of the lens of FIGS. 4D and 4E.

DETAILED DESCRIPTION OF THE INVENTION

Once a traditional soft contact lens is appropriately placed into the eye, it will maintain its position and stay aligned in relation to various optical elements, including the cornea, pupil and crystalline lens, no matter in which direction a person gazes. In other words, as a wearer looks, up, down or sideways, the optical axis of the contact lens will stay aligned relative to the optical axis of the eye. This constant positioning allows for the coupling of the power of the contact lens with the power of the visual axis of the eye. This in turn allows the contact lens to neutralize the excess or deficiency in refractive power of the eye. This is the basis for distance vision corrective contacts. Unfortunately it only addresses a single focal distance. For individuals, over the age of 40, who have lost the dynamic focusing power the crystalline lens, this type of contact lens is no longer sufficient.

This present invention takes advantage of this central positioning phenomenon by providing a multifocal lens having selectively changing optical characteristics along the same optical axis. More specifically, a soft contact lens is disclosed that changes its optical characteristics dynamically in response to gaze dependent pressure fluctuations induced by the eyelids relative to one or more reservoirs of fluid contained inside the contact lens. The following examples illustrate the various embodiments of the invention.

Figure 1:
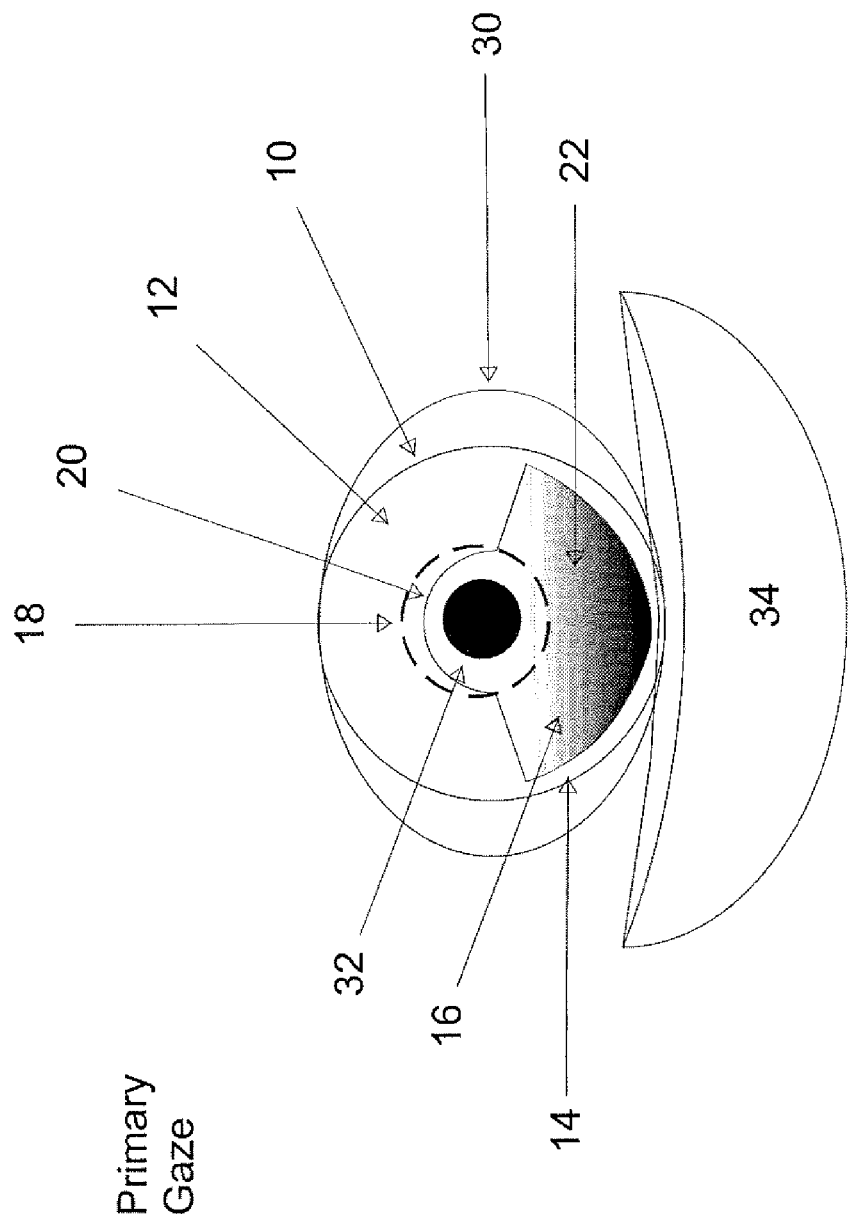
FIG. 1 shows the placement of a lens constructed in accordance with this invention over an eye.

An eye 30 is shown in FIG. 1, with pupil 32 and two eye lids (with only the lower lid 34 being shown for the sake of clarity). The active region of the eye, e.g., the region through which a person sees, is denoted by the circle 18. A contact lens 10 constructed in accordance with this invention is disposed on the eye.

As shown in FIGS. 1 and 2A the contact lens 10 has an upper section 12 that has the same optical characteristics as a traditional soft contact lens, which may or may not optically correct for distance, and a lower section 14 that is formed with a reservoir 16. This reservoir 16 is shaped somewhat like the letter D facing downward. The reservoir 16 is connected to an upwardly extending circular chamber 20 projecting over the center of the contact lens and region 18. The reservoir 16 is filled with a fluid 22. When a person wearing contact lens 10 looks down, the eyelid 34 presses on the reservoir 16 causing some of the fluid 22 to flow upward into chamber 20 thereby inflating the chamber.

FIGS. 2B and 2D show the cross section of the lens through the chamber 16, with the chamber 16 being deflated and inflated, respectively. FIGS. 2C and 2E show a lens equivalent to each of the configurations of FIGS. 2B and 2D. As can be seen in these figures, as a result of the inflation, the physical characteristics and curvature of the equivalent lenses increases dramatically when the chamber 20 is inflated.

A second embodiment of the invention is shown in FIGS. 2F-2K. In this embodiment, the chamber 20 consists of a plurality of linear micro-channels 21 that extend across a substantial portion of section 18 of the eye and are in communication with the reservoir 16. When the contact lens 10 is placed into an eye 30, the reservoir 16 is disposed below the visual axis that passes the pupil 32. The reservoir 16 is filled with fluid, such as saline solution, contact lens lubricant, artificial tears or other non-toxic material such as liquid silicone or even an un-polymerized contact lens monomer. This fluid can be chosen to have refractive indices similar to, higher, or lower than the contact lens polymer, in order to effect the optical properties selected to provide near vision correction. Upon insertion, the weight of the reservoir causes the lens to take the position shown in the figures, i.e., with the reservoir disposed at the bottom portion of the lens.

Figure 3B:
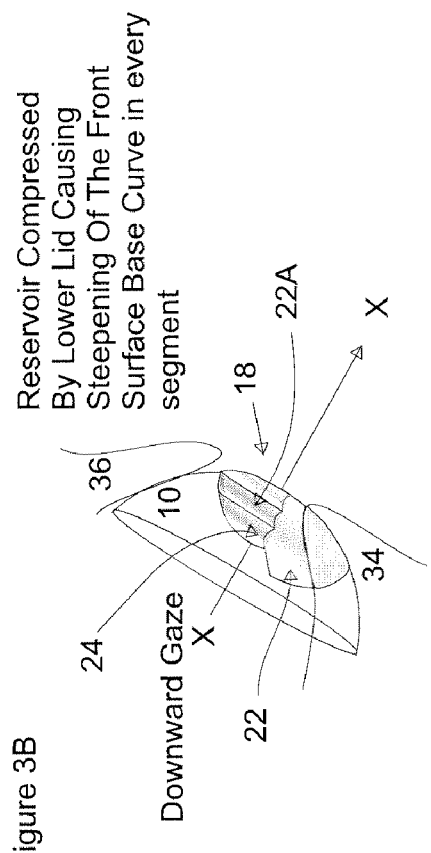
FIG. 3B shows the eye of FIG. 3A glancing downward
Figure 3A:
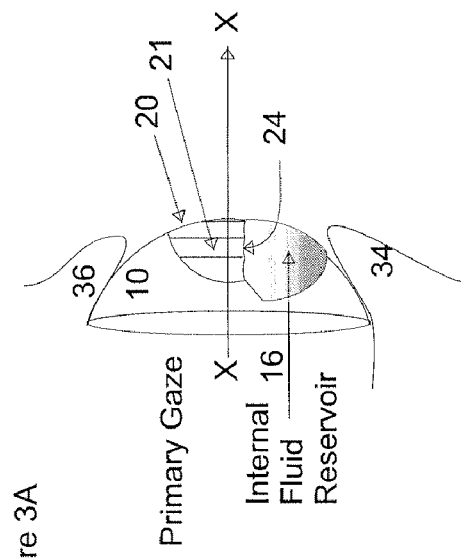
FIG. 3A shows a side view of an eye gazing forward with the lens of FIGS. 2F-2I.

When a wearer gazes straight forward for distance vision, he is looking along an optical axis X-X that passes through chamber 20. In this position, the fluid is primarily disposed in the reservoir 16 as shown in FIGS. 2F and 3A. In this position, the micro-channels 21 are non-pressurized or deflated as shown in FIGS. 2G and 2H. As a result, the portion of the lens 10 through which the wearer is gazing is configured either to provide distant vision correction or provides no optical effect.

To adjust to near vision, the wearer lowers his eye so that the axis of vision X-X is now disposed at a downward angle relative to the horizontal plane. As the eye ball rotates to this position, the eye lid 34 applies an upward pressure to the fluid 22 in the reservoir 16 causing the fluid to rise, thereby filling and expanding the micro-channels 21 of chamber 20, as shown in FIGS. 2I and 2J. The micro-channels 21 are sized and shaped to cause the lens 10 to become more convex thereby generating steeper base curve and causing a gradual shift in the optical characteristics of the contact lens. (The term 'steepen' is a term of the art and it relates to a distortion of a lens that causes the lens to become more convex.)

In other words, as shown in FIG. 2K, the lens 10 changes from a configuration shown on the right as having a low curvature to a configuration with a much higher curvature.

Advantageously, the process produces a gradual, rather than a sudden shift between far and near sight correction by changing the curvature of the lens 10.

To return to distance vision focus, the wearer looks up, thereby removing the pressure of apposition from the lid 34 on the reservoir 16, allowing the fluid 22 from each micro-channel 21 to flow down and return to the reservoir 16. This action is further assisted by the upper lid (not shown), which acts as a squeegee on the micro-channels 21 (utilizing the same "force of apposition" during a blink), causing the upper section of the reservoir to empty back into the lower portion of the reservoir. This action re-flattens the distended outer surface base curve in the optical section 18 of the contact lens 10 thereby returning the contact lens to distance vision.

In the embodiments of FIGS. 2A-2K, the lens shell formed of sections 12 and 14 and the liquid in the reservoir may have the same index of refraction, e.g., 1.4. Therefore even when the liquid is squeezed upward into chamber 20, the various elements of the contact lens 10 cooperate effectively to form a single lens along axis 18.

Alternatively, a fluid having an alternate index is used to further enhance the refractive change of the lens, thereby providing further multifocal capability. That is, depending the depth of gaze, the overall index changes from a combination composed mostly of the contact lens section 12 and a little refractive fluid in the chamber 20 to a combination formed of the contact lens and more refractive fluid in chamber 20. In this arrangement, the lens changes gradually from a configuration having optical characteristics dominantly for myopia (or other non-presbyoptic) correction to a configuration dominantly for presbyoptic correction while concurrently providing gradual change in myopic or other non-presbyoptic correction. This in turn creates a gaze dependent multifocal contact lens via in situ alteration of the refractive index (or the contact lens' optical characteristics).

In a third embodiment of the invention, the micro-tubules 21 are not in direct communication with the reservoir 16 but are sealed like many small linear balloons with a flexible ends or diaphragms 24 (shown in FIGS. 3A, 3B) and contain a liquid 22A. These diaphragms are made of the same material that the micro-tubules are made of and are arranged so that when the wearer is gazing forward, the diaphragms are either relaxed (e.g. flat) or they bulge slightly downward to allow the micro-tubules 21 to flatten. When the wearer gazes downward, some of the fluid 22 flows upward causing the diaphragm to bulge upward and expand the micro-tubles 21 as shown in FIG. 2I. This embodiment is advantageous because the liquid from the reservoir 16 is separated from the liquid in the micro-tubules 21 thereby preventing cross-contamination which may cause optical hazing and therefore blurred vision. Moreover, the fluid in the chamber 20 and its micro-channels 21 could have a different index of refraction then the liquid in reservoir 16.

FIGS. 4A-4F show a fourth embodiment of the invention. This embodiment also includes a reservoir 16 disposed at the bottom of contact lens 10 and having about the same size and shape as in the previous embodiments. However, the upper chamber 20 includes one or more annular micro-channels 11 encircling a sealed optic zone 19. The optic zone 19 is filled with a liquid, a gel, or a flexible solid and can exchange fluid or fluid pressure (through an appropriate diaphragm) from the reservoir 16 in the manner described for the other embodiments. When a wearer gazes forward for distance vision, the wearer looks along an optical axis that passes through section 19. In this position, the fluid in the surrounding ring 11 is primarily or totally disposed in the lower portion of the reservoir 16 as shown in FIGS. 4A and 4C causing the circumferential ring to be in a non-expanded or deflated state. In this configuration, the portion of the lens 19 through which the wearer is looking is configured to provide either no optical effect on the wearer's vision or to provide distant vision.

In order to change the contact lens to near vision correction, the eye is lowered, and the pressure of the lower lid 34 on the contact lens 10 causes the fluid in the reservoir 16 to rise, thereby filling and expanding the micro-channels 11 surrounding section 19, as shown in FIGS. 4D-4F. In other words, the lower lid 34, which normally applies pressure directly to the eyeball during downward gaze, now is used to compress the reservoir and force the fluid up into the circumferential micro-channel or ring 11. As a result, central optic zone 19 is inwardly compressed and deformed to a steeper base curve or a more convex lens surface causing a shift in the optical characteristics of the contact lens (see FIGS. 4D-4F). Advantageously, the depth of downward gaze defines the optical characteristic of the contact lens and will therefore dictate the progression of optical change in relation to that of the downward gaze. This creates a gaze dependent multifocal contact lens via in situ alteration of the base curve.

To return to distance vision focus, the wearer looks up, moving the contact lens up away from the lower lid 34, thereby releasing the pressure on the lower reservoir and allowing the fluid from the micro-channels 11 to flow back down into the peripheral reservoir 16. This action removes any deforming pressure on the central optic zone 19. This action is further assisted by the upper lid 36 which acts as a squeegee (utilizing the same "force of apposition" during a blink). This flattens the distended center optic zone 19 returning the focus to distance.

The preceding sections are a general description of how hydrodynamic forces can be employed to alter the refractive nature of a contact lens. It is not meant to be an exhaustive or limiting only instructive on the general implementation of fluid dynamics to induce refractive changes in a contact lens. To anyone skilled in the art many variations or combinations can easily be envisioned or applied to this invention without departing from its scope as defined in the appended claims.

I claim:

1. A soft contact lens comprising:
a disc-shaped body having a central portion selectively providing visual correction when worn by a person;
a fluid reservoir having an opening and holding a fluid, said fluid reservoir being collapsible and being formed in said body away from said central portion and positioned to be selectively pressurized and depressurized by the person's eye lid as the person gazes downward and forward, causing said fluid reservoir to collapse when pressurized causing the fluid to exit through said opening, said fluid returning to said fluid reservoir when said fluid reservoir is depressurized; and
a chamber with a micro-channel disposed in said central region and being in communication with said fluid reservoir through said opening, said chamber being selectively filled with said fluid as said fluid reservoir collapses, said micro-channel being arranged and constructed to change the optical characteristics of the lens by changing the curvature of said central region in response to changes in the pressure of said reservoir.

2. The lens of claim 1 wherein said lens body is changed by said micro-channel between said first and second shape by selectively steepening or unsteepening said shape.

3. The lens of claim 1 wherein said liquid has the same index of refraction as the lens body.

4. The lens of claim 1 wherein said liquid has an index of refraction different from that of the lens body.

5. The lens of claim 1 wherein said lens body is adapted to change shape in response to a squeezing action from the eyelids of a wearer.

6. The lens of claim 1 further comprising a diaphragm positioned to transmit pressure between said reservoir and said chamber.

7. A soft contact lens comprising:
a round lens body having a central zone defining a visual axis through which a wearer is gazing when the lens body is disposed in an eye, and a lower portion;
a reservoir formed within the lower portion to hold a fluid; and
a chamber disposed in said central zone and including at least one microchannel in fluid communication with said reservoir, said reservoir and said chamber cooperating with said lens body to provide the lens with one of a first optical characteristic and a second characteristic along said visual axis, based on the relative amount of fluid in said reservoir and said chamber;
wherein said body is made of a soft material causing said reservoir to collapse when the wearer gazes downward caused by the eye lid applying an inward pressure on the reservoir causing some of said liquid to flow from said reservoir to said chamber.

8. The soft contact lens of claim 7 wherein said chamber is adapted to selectively steepen or unsteepen the curvature of the lens as said fluid is transferred between said chamber and said reservoir.

9. The soft contact lens of claim 8 wherein said fluid has the same index of refraction as said lens body.

10. The soft contact lens of claim 7 wherein said fluid has a different index of refraction then said lens body.

11. The soft contact lens of claim 10 wherein said visual axis passes through said first section and wherein when said first section is filled with liquid, said lens body and said reservoir cooperate to form a multi-lens path along said visual axis including a back portion of said lens body, said first section and a front portion of said lens body.

12. The soft contact lens of claim 10 wherein said visual axis passes through said first section and wherein when said first section is filled with liquid, said lens has an optical power that is primarily dependent on the optical characteristics of said fluid.

13. The lens of claim 7 wherein said lens body is adapted to respond to a wiping action of the wearer eyelids, said wiping action providing pressure on said lens body to cause liquid to shift between said reservoir and said central zone.

14. The lens of claim 7 wherein said lens has a front and a back surface and said microchannel has a first surface and a second surface, said first surface being disposed closer to said front then to said back surface, said first surface being inflated by said fluid to cause a portion of said front surface corresponding to said central zone to bulge outwardly to increase the diopter of said lens.

15. The lens of claim 14 further comprising a plurality of microchannels, said microchannels being inflated by said fluid to change the diopter of said lens.

16. The lens of claim 15 wherein said microchannels are arranged in parallel to each other.

* * * * *